Nov. 2, 1926.  
F. S. KOCHENDORFER  
1,605,244  
CABLE OR STRAND HANDLING AND WORKING MACHINE  
Filed Jan. 7, 1922   3 Sheets-Sheet 2
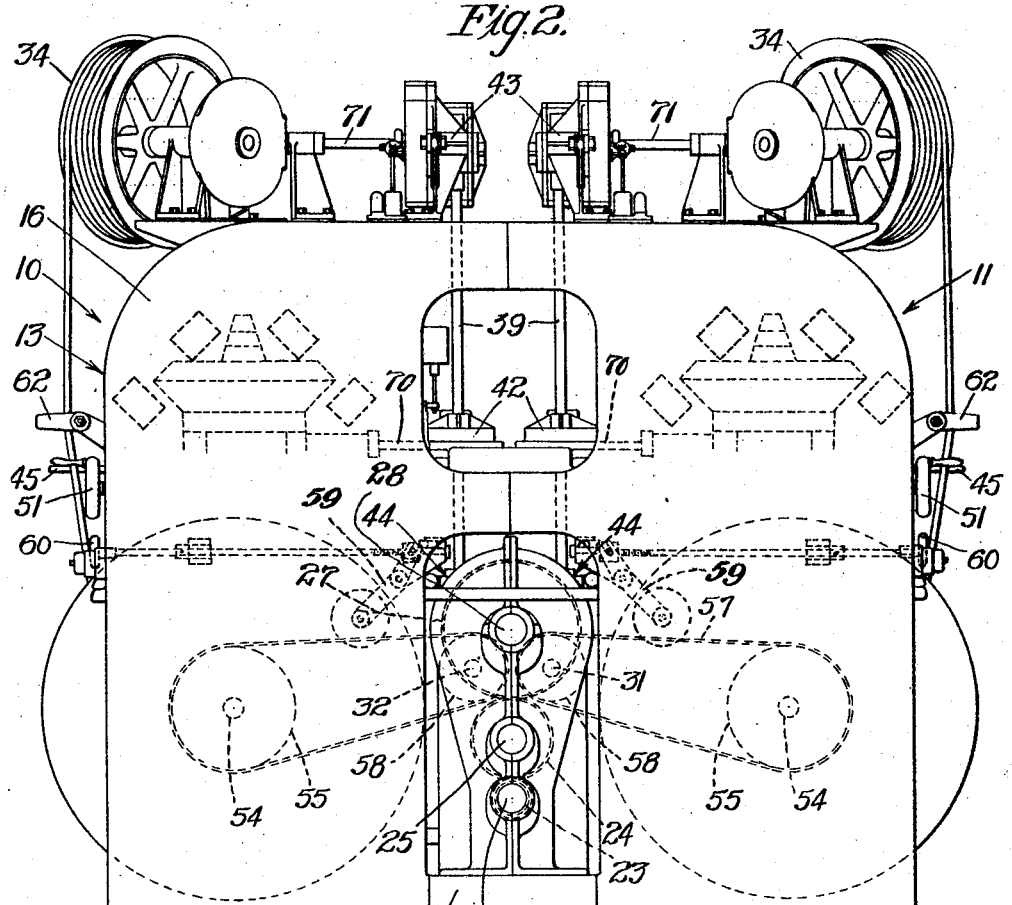
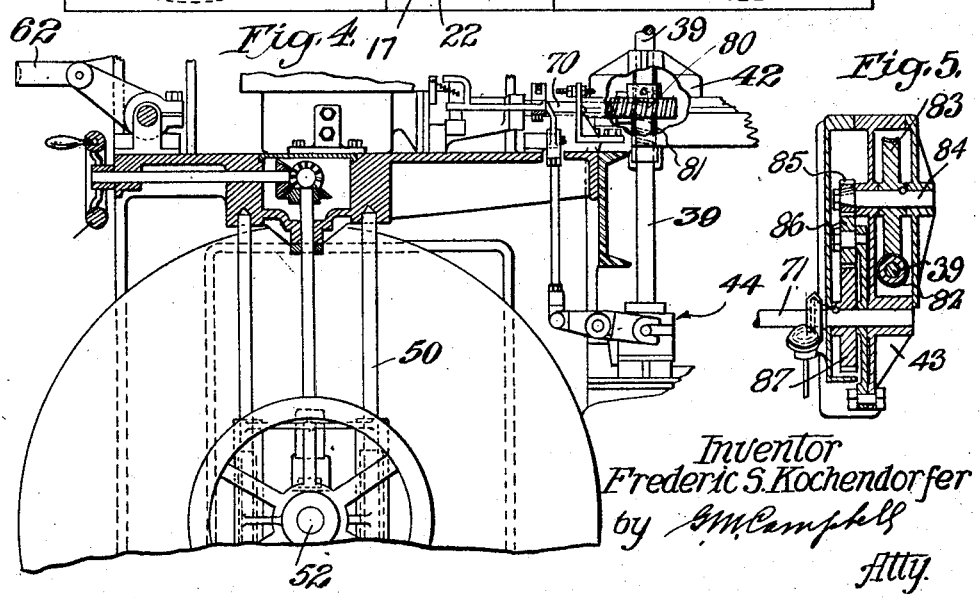
Inventor  
Frederic S. Kochendorfer  
by G. M. Campbell  
Atty.

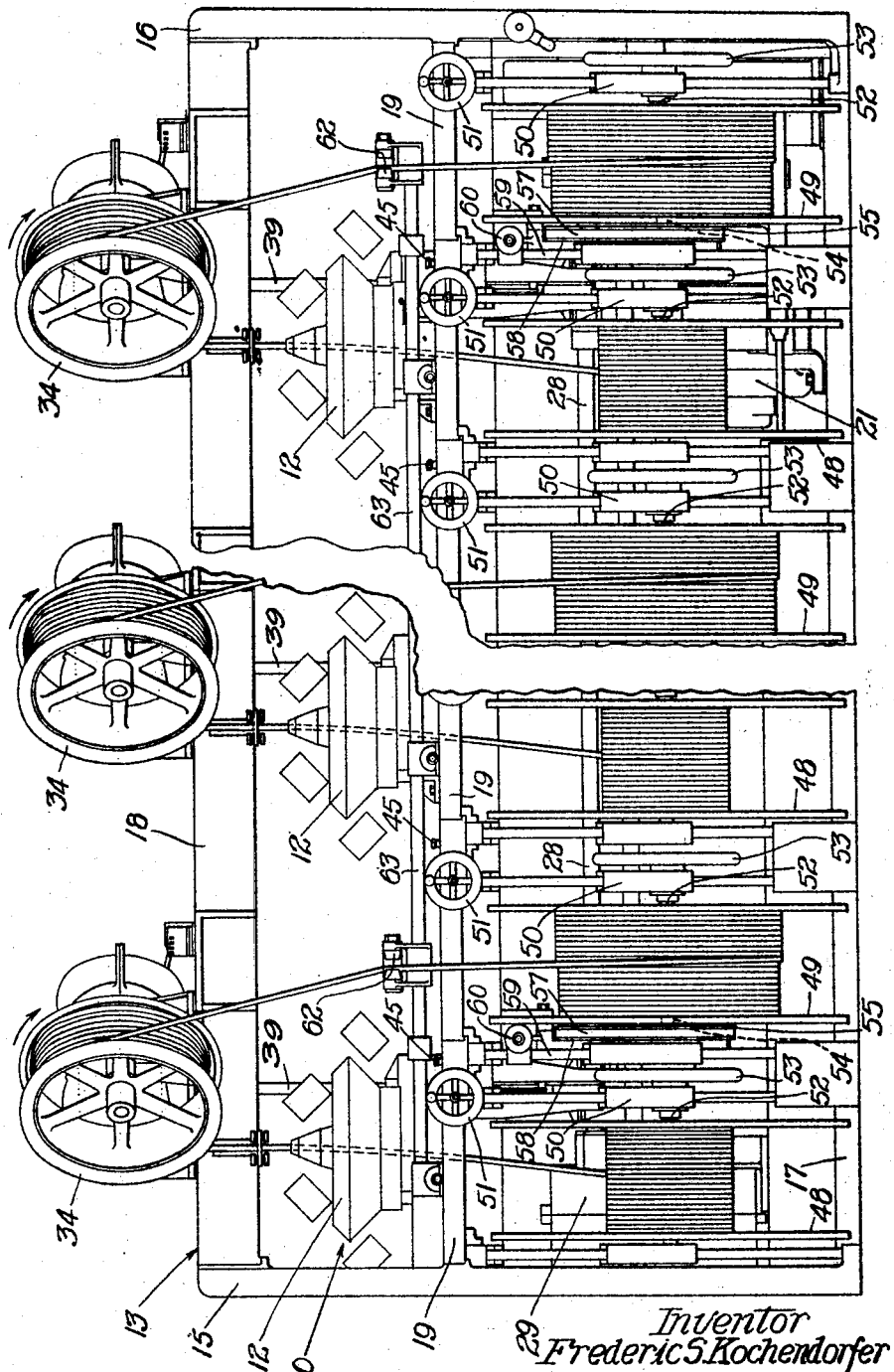

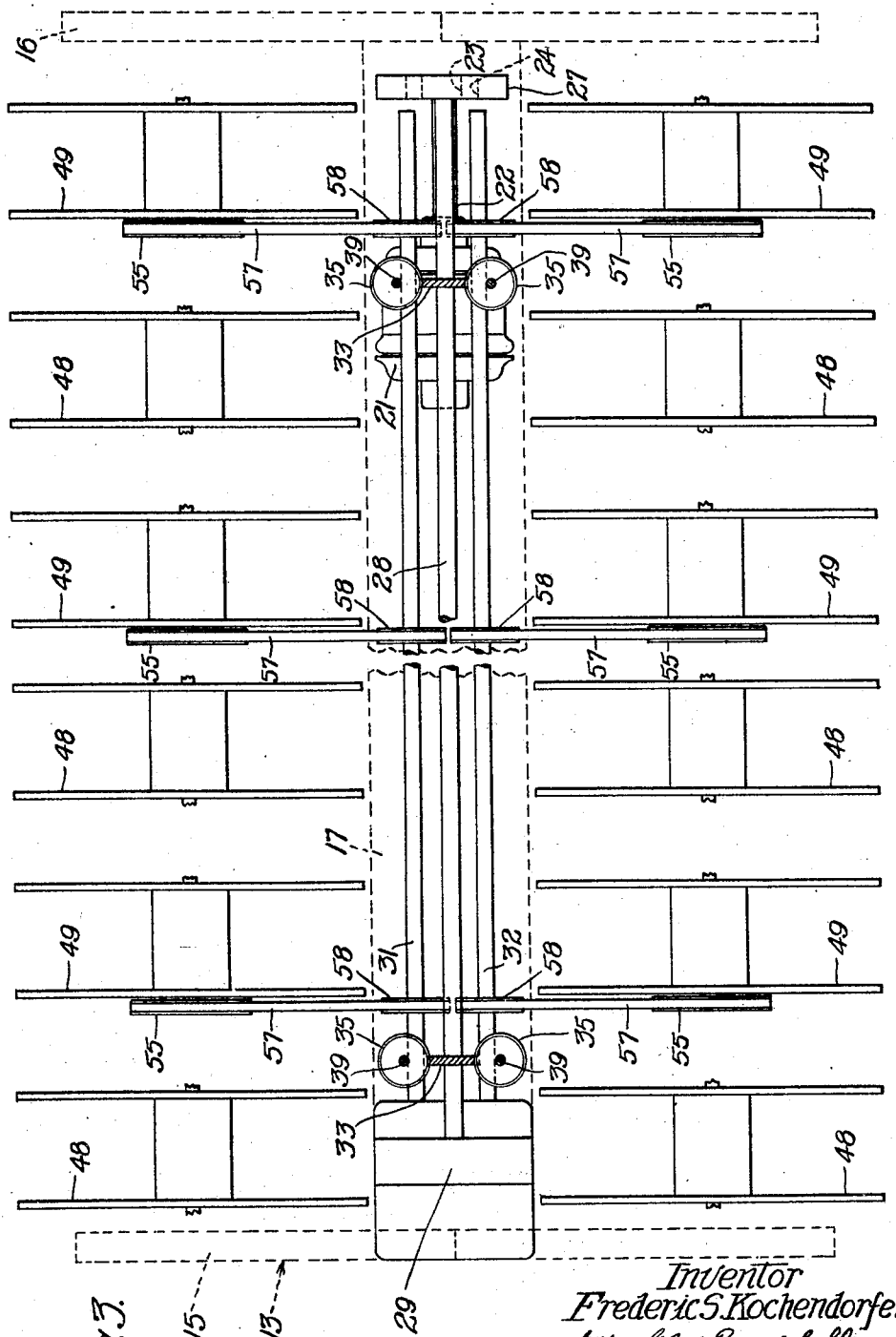

Patented Nov. 2, 1926.

1,605,244

UNITED STATES PATENT OFFICE.

FREDERIC S. KOCHENDORFER, OF RIVER FOREST, ILLINOIS, ASSIGNOR TO WESTERN ELECTRIC COMPANY, INCORPORATED, OF NEW YORK, N. Y., A CORPORATION OF NEW YORK.

CABLE OR STRAND HANDLING AND WORKING MACHINE.

Application filed January 7, 1922. Serial No. 527,570.

This invention relates to cable or strand handling and working machines, and more particularly to a machine for braiding switchboard cable.

The object of this invention is to produce a machine which will be so compact in structure as to substantially increase the productive capacity of the floor space occupied, be efficient in operation, and be so arranged that the machine operator may attend a greater number of braiding heads carried thereon with less exertion and fatigue than under the usual conditions of operation and production.

In the preferred form of the invention the machine consists of a single unitary frame mounting upon opposite sides thereof a plurality of braiding heads with supply and take-up reels associated with each head mounted side by side directly below the heads. Carried upon the top of the frame along each side above the heads are a plurality of capstans, one for each head and so disposed angularly with respect to the head and its associated supply and take-up reels that the cable is led from the supply reel direct to the braiding head, then around the capstan and to a distributing member which lays the braided cable in even layers directly upon the take-up reel without the use of any auxiliary guiding members. A main driving shaft is carried by the frame and gearing is provided for each braiding head and its respective mechanism adapted to drive it. The operative connection of the gearing of each braiding head with the main driving shaft is controlled by cluth mechanism individual to such head, and the clutch mechanism of each head may be operated to stop or start its respective head without in any way affecting the clutch mechanism associated with the other heads.

In the drawings:

Figure 1 is a fragmentary front elevation of a machine embodying the features of the invention with standard Wardwell braiding heads used therewith shown diagrammatically;

Fig. 2 is an end elevation taken from the right-hand end of Fig. 1 showing the arrangement of two rows of machines back to back mounted upon a single frame and driven from a common source;

Fig. 3 is a schematic fragmentary plan view of the machine showing the drive from the driving motor to the take-up reels, braiding heads and capstans;

Fig. 4 is a transverse section taken on line 4—4 of Fig. 1, and

Fig. 5 is a sectional view showing the arrangement of the gears through the medium of which the capstans are driven.

As illustrated in the drawings, the complete machine comprises two horizontal rows 10 and 11 of braiding heads 12, 12 positioned back to back and the whole carried upon a single supporting frame 13 built from end stardards 15 and 16, a central longitudinal base member 17, top member 18, and members 19, 19 forming a shelf at each side upon which the heads 12, 12 are carried and intermediate the base and top members 17 and 18. The standards 15 and 16, base and top members 17 and 18, and shelf members 19 are suitably secured together to form the single unitary frame 13.

In the preferred form of the invention as illustrated in the drawings, each row comprises seven heads although a less number is shown for convenience of illustration but it will be readily understood that the number may vary and also that the complete machine may comprise only one row of heads 12, 12, for instance, if one row were positioned against a wall. Mounted upon the base member 17 near one end of the machine and central with respect to the two rows of heads is a motor 21 for driving the entire machine comprising the two rows 10 and 11 of braiding heads. Referring to Fig. 3, which shows schematically the drive for the machine, a shaft 22 projects from the motor to the right and has secured thereto a pinion 23 which meshes with an intermediate gear 24 carried upon a stub shaft 25. The gear 24 meshes with a main driving gear 27 secured upon a main driving shaft 28 which extends the entire length of the machine and at its end enters a suitable change speed and gear box 29 from which two shafts 31 and 32 project. The shafts 31 and 32 are parallel to the main shaft 28 and extend the entire length of the machine and as shown in dotted outline in Fig. 2 are positioned one on each side of the main shaft 28, and a short distance therebelow.

Secured upon the main shaft 28 are spiral gears 33, 33 for driving the braiding heads 12, 12 and capstans 34, 34 positioned upon the top member 18. Each spiral gear 33 meshes with spiral gears 35, 35 positioned at opposite sides thereof and upon vertically disposed shafts 39, 39. The shafts 39 extend upwardly and are connected to the respective horizontally disposed shafts 70 by gears 80 and 81 (Fig. 4) located in the housing 42 through the medium of which the heads 12, 12 are driven. In the case of the horizontally disposed shafts 71 which are connected to the capstans 34, 34 and through the medium of which they are driven, the shafts 39 terminate in a worm gear 82 (Fig. 5) which meshes with a gear 83 secured to a shaft 84. Also secured to the shaft 84 is a gear 85 which meshes with a gear 86 disposed intermediate gear 85 and a gear 87 fastened to shaft 71. Power is thus communicated to the capstans 34, 34 from the shafts 39 to the shafts 71 through gears 82, 83, 85, 86 and 87 which are protected by the housing 43. The shafts 39 are each equipped with a suitable clutch mechanism 44, each clutch being adapted to be operated from the front of the machine and close to the braiding head which it controls by a lever 45. Suitable bearings and supporting means are provided for the drive from the motor to the heads 12, 12 and capstans 34, 34. A supply reel 48 and a take-up reel 49 are suitably positioned side by side in line with and directly under each braiding head and near the floor line where they may be quickly and easily mounted or removed from their supporting or driving spindles. As shown in the drawings, the supply and take-up reels for each row of braiders are all positioned on one side of the machine directly under their respective head and in close arrangement, thereby causing less exertion and fatigue of the operator who preferably has charge of one row of braiders. In prior machines of this type the supply reel is positioned on the opposite side of the machine to the take-up reel, thereby requiring the operator to attend to both sides of the machine, which in case there was a bank of machines would require considerable walking from the middle of the bank to the end and then to the other side, and at the same time reduce the number of braiders which an operator could properly handle. Suitable mechanism indicated at 50 and operated by a hand wheel 51 is provided for elevating and lowering the reels with their spindles when mounting or removing them from the machine.

One end of each of the supply and take-up reels is supported upon a spindle 52, and the other end of each of the take-up reels is supported upon a spindle 54. The other end of each supply reel is also suitably supported upon a spindle, but as such support is of the usual construction, no specific description thereof need be given.

Each spindle indicated at 52 is adapted to be moved horizontally in either direction by suitable mechanism actuated by a hand wheel 53 when mounting or removing a reel from the machine in a well known manner. Each spindle indicated at 54 is a driving spindle for a take-up reel with which they make suitable engagement. Each of spindles 54 is secured to a pulley 55 which is provided with suitable bearings adapted to move with the spindle 54 when the reel is being elevated or lowered. A driving belt 57 connects each pulley 55 with a pulley 58, a plurality of which are secured on the shafts 31 and 32. Suitable adjusting mechanism indicated at 59 and controlled by a hand wheel 60 is provided for each belt to tighten or loosen it as desired. The finished cable being taken up is suitably distributed across the width of each take-up reel by passing between distributor fingers 62, 62 which are carried upon a reciprocable shaft 63, one for each row of heads. The shafts 63 are continuously being reciprocated back and forth by suitable gearing (not shown) connected with the main driving shaft 28. The capstans 34, 34 are disposed at such an angle upon the top member 18 that the cable in being drawn from the supply reel, passed through the braiding head where it is covered, and then around the capstan several times and to the take-up reel does not need to be guided or supported by guide sheaves or guide members, with the exception of the distributor fingers 62—62 which act to distribute the cable across the width of the reel.

In operation the main shaft 28 and the shafts 31 and 32 are being constantly driven through the means described before, which causes the vertical shafts 39, 39 to revolve and thereby drive the heads 12, 12 and capstans 34, 34 in the manner previously described and at the same time the shafts 63 are being constantly reciprocated to move back and forth the cable distributing fingers 62, 62. Each of the heads 12, 12 with its associated capstans 34 may be started and stopped independently of the other heads and capstans by operating its clutch mechanism 44 without affecting the clutch mechanism associated with the other heads. When the clutch mechanism 44 is operated to stop a head the capstan associated therewith also stops. As the shafts 31 and 32 are not stopped by operating the clutch mechanism 44, the belt 57 will slip on the pulley 58 due to the cable which is passed several times around the capstan 34 being drawn tight thereon.

The machine above described, having a plurality of braiding heads arranged in pairs back to back with the associated supply and take-up reels positioned thereunder side by side and the capstans arranged above the heads at an angle to their associated heads and reels whereby the machine is simplified and the whole being driven by a central driving mechanism positioned between the rows of heads provides a machine which has great productive capacity for the floor space occupied thereby. Also due to the general arrangement of the parts, an operator may attend a larger number of braiding heads and with less exertion and fatigue than with prior known machines of this type.

What is claimed is:

1. In a multiple unit braiding machine, the combination with a frame, of a plurality of braiding heads arranged in two horizontal parallel rows back to back, supply and take-up reels for the cable individual to each head positioned side by side below each head, means for distributing the cable upon the take-up reel, and capstans one for each head disposed upon a horizontal axis thereabove at an angle to the axes of the supply and take-up reels whereby the cable is drawn direct from the supply reel through the braiding head and to the distributing mechanism.

2. In a multiple unit braiding machine of the class described in combination a unitary frame comprising a pair of end members, a top member and intermediate shelf members upon each side thereof, a plurality of serving heads mounted upon opposite sides of the frame upon the shelf members, a support and take-up reel for each serving head mounted below the shelf members in line with each serving head, and a capstan individual to each serving head mounted upon the top member of the frame and angularly disposed with respect to the axes of the corresponding supply and take-up reels to lead the cable directly from one to the other through the serving head.

3. In a multiple unit braiding machine of the class described in combination a unitary frame comprising a pair of end members, a top member and intermediate shelf members upon each side thereof, of a plurality of serving heads mounted upon a shelf member, a supply reel and take-up reel common to each serving head mounted below said shelf members in operative relation to the serving heads, a capstan individual to each serving head mounted upon the top frame member in operative relation to the serving head and the corresponding supply and take-up reels, the capstan being angularly disposed with respect to the axes of the supply and take-up reels, a common driving means centrally located upon said frame and driving connections for the take-up reels, the serving heads and the capstans extending from the common driving means.

4. In a multiple unit braiding machine, the combination with a single unitary frame, of a plurality of braiding heads arranged back to back in two horizontal parallel rows upon said frame, supply and take-up reels for the cable arranged in pairs individual to each braiding head, carried by said frame and positioned side by side below each braiding member, a common driving means for the braiding heads, and a clutch interposed between each braiding head and said common driving means.

In witness whereof, I hereunto subscribe my name this 23rd day of December A. D., 1921.

FREDERIC S. KOCHENDORFER.